United States Patent [19]

Noguchi et al.

[11] Patent Number: 4,594,621
[45] Date of Patent: Jun. 10, 1986

[54] ROTARY HEAD TYPE DIGITAL INFORMATION SIGNAL RECORDING AND REPRODUCING APPARATUS AND TRACKING CONTROL METHOD THEREIN

[75] Inventors: Takaharu Noguchi; Shigeru Yamazaki; Takao Arai, all of Yokohama, Japan

[73] Assignee: Hitachi, Ltd., Tokyo, Japan

[21] Appl. No.: 649,654

[22] Filed: Sep. 12, 1984

[30] Foreign Application Priority Data

Sep. 14, 1983 [JP]  Japan .................................. 58-168157

[51] Int. Cl.⁴ ............................ G11B 5/52; G11B 5/56
[52] U.S. Cl. .................................... 360/77; 360/70
[58] Field of Search ........................... 360/70, 73, 77

[56] References Cited

U.S. PATENT DOCUMENTS

| | | | |
|---|---|---|---|
| 4,348,699 | 9/1982 | Tsuchiya et al. | 360/32 |
| 4,376,268 | 3/1983 | Moriya et al. | 331/10 |
| 4,445,146 | 4/1984 | Sakamoto et al. | 360/10.3 |
| 4,482,928 | 11/1984 | Moriya et al. | 360/77 |
| 4,511,933 | 4/1985 | Hofelt et al. | 360/47 |

Primary Examiner—George G. Stellar
Attorney, Agent, or Firm—Antonelli, Terry & Wands

[57] ABSTRACT

In a rotary head type digital information signal recording and reproducing apparatus having plural rotary heads mounted on a rotary drum so as to be capable of recording and reproducing signals on parallel, oblique tracks on a magnetic tape, a tracking signal is recorded on at least one portion of each track which is not overlapped with a portion of each track where a digital information signal is recorded to avoid interference between the tracking signal and information signal. The tape travel speed and the rotary drum rotation speed are changed depending upon the transmission rate for a digital information signal to be recorded and reproduced to make the wavelength of a recorded signal frequency constant irrespective of the signal transmission rate. Tracking control is enhanced without increasing the error rate.

7 Claims, 13 Drawing Figures

ROTARY HEAD TYPE DIGITAL INFORMATION SIGNAL RECORDING AND REPRODUCING APPARATUS AND TRACKING CONTROL METHOD THEREIN

The present invention generally relates to a rotary head type digital signal recording and reproducing apparatus and more particularly to a rotary head type PCM signal recording and reproducing apparatus and a tracking control method for the apparatus.

In the recent years, a remarkable progress has been made in the digital processing tecknique of the audio signal, inclusive of the development of CD (compact disk) player system. In connection with the tape recorder, a PCM adapter for allowing the digital recording and reproduction of the audio signal by making use of a hitherto known VTR (video tape recorder) is now on the market. Besides, there exists a great demand for a rotary head type digital signal recording and reproducing apparatus of a miniature size destined only for the audio application.

On the other hand, in the commercially available 8-mm video system in which the PCM technique is adopted for recording the audio signal by using the rotary heads, a tracking signal is recorded in overlap to the digital information or data signal on oblique tracks. In that case, severe restriction is imposed on the frequency and amplitude of the tracking signal in order to suppress the adverse influence exerted otherwise to the information or data signal by the tracking signal. As a consequence, the tracking control for the rotary heads is not necessarily accomplished to a satisfactory degree.

In the recording and reproducing apparatus in which the tracking signal is employed as described above, the influence exerted to the digital information signal by the tracking signal and to the tracking signal by the digital information signal will vary in dependence on the change in the transmission rate of the recording (input) digital signal, making it difficult or impossible to maintain the accuracy of the tracking control to be constant.

An object of the present invention is to provide a digital information signal recording and reproducing apparatus and a tracking control method therefor in which error rate is prevented from being increased even when the transmission rate of the recording signal is changed and which can thus enjoy an improved signal-to-noise ratio (hereafter referred to as S/N ratio).

According to an aspect of the present invention, the tracking signal is recorded on the oblique track at a region which does not overlap the region where the digital information signal is recorded, to thereby prevent the digital information signal and the tracking signal from mutual interference irrespective of changes in the transmission rate of the digital information signal to be recorded, while the tape traveling speed and the rotation speed of the rotary drum having the recording/reproducing heads fixedly mounted thereon are so controlled that the recording density of the digital information or data signal and the tracking signal may remain constant independent of the changes in the transmission rate.

By providing the digital data signal recording region and the tracking signal recording region on the oblique track so that both the regions do not overlap each other, the mutual interference of both signals can be positively prevented from occurrence, which in turn means that the frequency and/or the recording level of the tracking signal can be increased, involving an improved S/N ratio of the tracking signal. As a consequence, the accuracy of the tracking control is improved. Further, the after (posterior) recording of the data or information signal can be made with the aid of the tracking signal as recorded.

For a better understanding of the present invention, description will first be made of a hitherto known digital signal recording and reproducing apparatus by referring to FIGS. 1 to 4.

Figure 1:
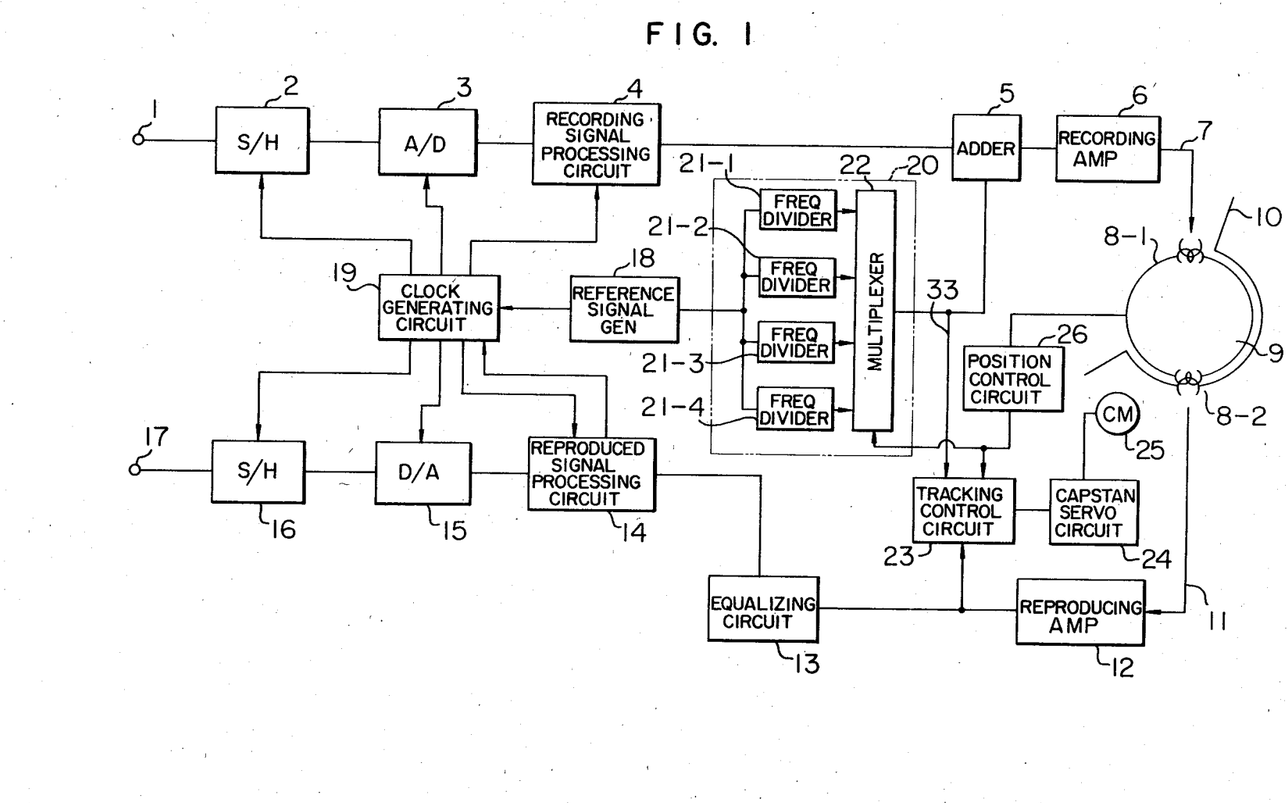
FIG. 1 is a block diagram showing a rotary drum and an audio signal processing section of a hitherto known rotary head type digital signal recording and reproducing apparatus.

FIG. 1 shows a typical one of the hitherto known rotary head type digital signal recording and reproducing apparatus. More specifically, this figure shows an example of the audio signal processing unit of the digital signal recording and reproducing apparatus in which the wrap angle of a recording medium or tape wrapped around a rotary head drum is selected greater than the angle at which the magnetic heads are mounted on the drum so that a so-called overlap period is made available in which a pair of the heads are simultaneously brought into contact with the recording medium, wherein during the overlap period the audio signal converted into a PCM digital signal is recorded. In FIG. 1, a reference numeral 1 denotes an analogue signal input terminal, 2 and 16 denote, respectively, sample and hold circuits, 3 denotes an analogue-to-digital or A/D converter, 15 denotes a digital-to-analogue or D/A converter, 4 denotes a recording signal processing circuit, 14 denotes a reproduced signal processing circuit, 5 denotes an adder circuit, 6 denotes a recording amplifier, 7 denotes an output terminal for the recording signal, 8-1 and 8-2 denote recording/reproducing heads provided for both channels, respectively, 9 denotes a rotatable or rotary drum, 10 denotes a recording medium or tape, 11 denotes a reproduction output signal produced by the heads, 12 denotes a reproducing amplifier, 13 denotes an waveform equalizer circuit, 17 denotes an analogue signal output terminal, 18 denotes a reference signal generator circuit, 19 denotes a clock generating circuit, 20 denotes a tracking signal generator, 21-1, ..., 21-4 denote frequency divider circuits, respectively, 22 denotes a multiplexer, 23 denotes a tracking control circuit, 24 denotes a capstain servo circuit, 25 denotes a capstain motor, and 26 denotes a position control circuit.

In the first place, the digital signal recording and reproducing processes will be elucidated by referring to FIG. 1. In the recording mode of the apparatus shown in FIG. 1, an analogue signal applied to the analogue signal input terminal 1 is sampled by the sample and hold circuit 2 and subsequently converted into a PCM digital signal by the A/D converter 3. The PCM digital signal output from the converter 3 then undergoes a time base (axis) compression and addition of error detecting and correcting codes and a synchronizing signal in the recording signal processing circuit 4. The output signal of the processing circuit 4 is added with a tracking signal produced by the tracking signal generator circuit 20 by the adder circuit 5. The resultant signal is then amplified by the recording amplifier 6 to be subsequently recorded on the recording medium 10 traveling at a predetermined speed, being driven by the capstain motor 25, by means of the recording/reproducing heads 8-1 and 8-2 which are mounted on the rotary drum 9 rotating at a predetermined revolution speed. The recording/reproducing heads 8-1 and 8-2 are disposed on the rotary drum or cylinder 9 in diametrical opposition to each other with an angular distance of about 180° therebetween. On the other hand, the recording medium or tape 10 is caused to bear on the recording/reproducing heads 8-1 and 8-2 at the wrap angle of about 210° relative to the latter.

Figure 2:
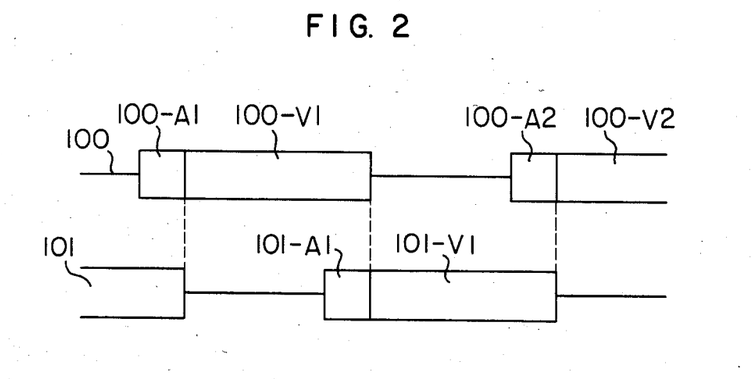
FIG. 2 is a view illustrating the timing of recording and reproducing operations of a recording/reproducing heads.

FIG. 2 shows a timing chart for illustrating recording and reproducing operations of the recording/reproducing heads 8-1 and 8-2. In FIG. 2, a reference numeral 100 denotes a recording pattern of the recording/reproducing head 8-1 and 101 denotes a recording pattern of the recording/reproducing head 8-2. Symbols 100-A1, 100-A2 and 101-A1 designate regions in which the PCM digital audio signal is recorded, and 100-V1 and 100-V2 designates regions in which video signal is recorded. As will be seen in FIG. 2, the audio signal is converted into the PCM digital signal through the circuit shown in FIG. 1 and thereafter compressed in respect to the time base or axis as indicated by 100-A1, 100-A2 and 101-A1 to be subsequently recorded by the respective recording/reproducing heads.

In the reproducing operation mode, the signal picked up by the recording/reproducing heads 8-1 and 8-2 is amplified by the reproducing amplifier 12 and supplied to the waveform equalizer circuit 13 in which deterioration due to the transmission characteristic of the apparatus is correctively compensated. Thereafter, the signal output from the waveform equalizer 13 undergoes the time base (axis) expansion as well as error detection and correction in the reproduced signal processing circuit 14, whose output signal is converted into an analogue signal by the D/A converter 15. The analogue signal thus reproduced is then sampled by the sample and hold circuit 16 to be subsequently outputted from the analogue signal output terminal 17. The sample and hold circuits 2 and 16, the A/D converter 3, the D/A converter 15, the recording signal processing circuit 4 and the reproduced signal processing circuit 14 are controlled in the operation timing by clock signals which are produced by the clock generator circuit 19 on the basis of the reference clock generated by the reference signal generator 18.

Next, description will be made on the tracking control. The tracking control adopted in the apparatus shown in FIG. 1 is of a four tracking signal control type in which tracking signals of four different frequencies is made use of as in the case of an 8-mm type video tape system. Again referring to FIG. 1, the clock signal generated by the reference signal generator 18 is supplied to the input of the tracking signal generating circuit 20 which is composed of four frequency dividers 21-1, ..., 21-4 having respective division ratios differing from one another and a multiplexer 22. The tracking signal generator circuit 20 produces as the output the four tracking signals of different frequencies. In this tracking signal generating circuit 20, the multiplexer 22 is changed over in response to the output signal of the position control circuit 26 which is controlled by the output of means for detecting the angular positions of the recording/reproducing heads (not shown) generated in synchronism with the rotation period of the rotary drum 9, whereby the four tracking signals of different frequencies are sequentially supplied to the adder circuit 5 to be superposed on the digital information or data signal to be recorded, the output of the adder circuit being then supplied to the recording amplifier 6.

Figure 3:
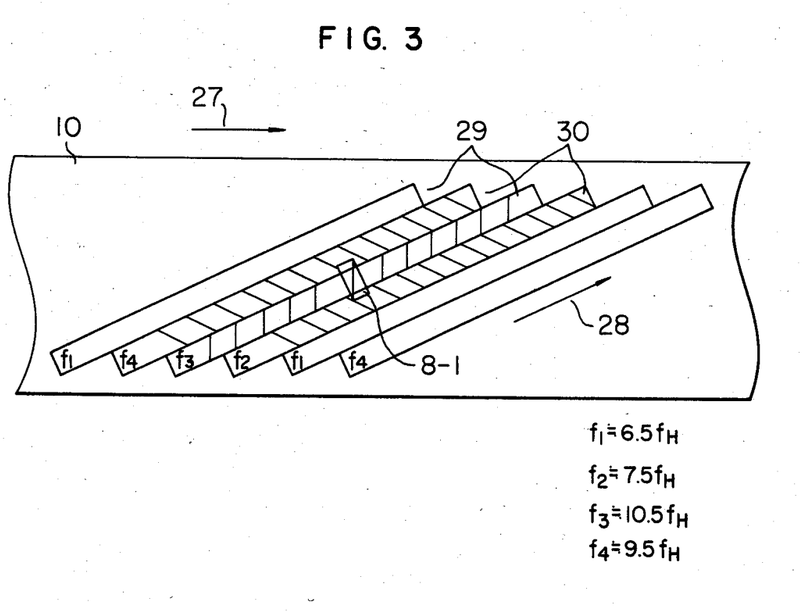
FIG. 3 is a view showing a recording format on a magnetic tape in the apparatus shown in FIG. 1.

FIG. 3 shows a recording format on the recording medium or tape 10. The signal is recorded along the head rotating direction 28 on the recording tape 10 traveling in the direction 27 by means of the revolving recording/reproducing heads 8-1 and 8-2. At that time, the recording/reproducing heads 8-1 and 8-2 perform alternately the recording at azimuth angles differing from each other, to thereby form the recording tracks 29 and 30.

The tracking signals of four frequencies $f_1$, $f_2$, $f_3$ and $f_4$ are recorded on all the tracks as superposed on the digital data signal in the order of $f_1$, $f_2$, $f_3$ and $f_4$ on each of the recording tracks 29 and 30. Although the frequencies of the tracking signal should preferably be as high as possible in view of the servocontrol, the high frequency will involve increasing in the error rate to some degree, because the tracking signal provides an external noise to the digital data signal. Such being the circumstance, the frequencies of the tracking signal have been set in a relatively low frequency band such that $f_1 \approx 6.5\ f_H$, $f_2 \approx 7.5\ f_H$, $f_3 \approx 10.5\ f_H$ and $f_4 \approx 9.5\ f_H$ in the case of the 8-mm type video system, where $f_H$ represents the horizontal synchronizing signal of the video system. Further, in order to prevent recording level of the four-frequency tracking signal from exerting adverse influence to the digital information or data signal, the recording level of the tracking signal has been set at about −20 dB relative to the peak level of the digital information or data signal. Nevertheless, adequately high S/N ratio has not been attained.

Figure 4:
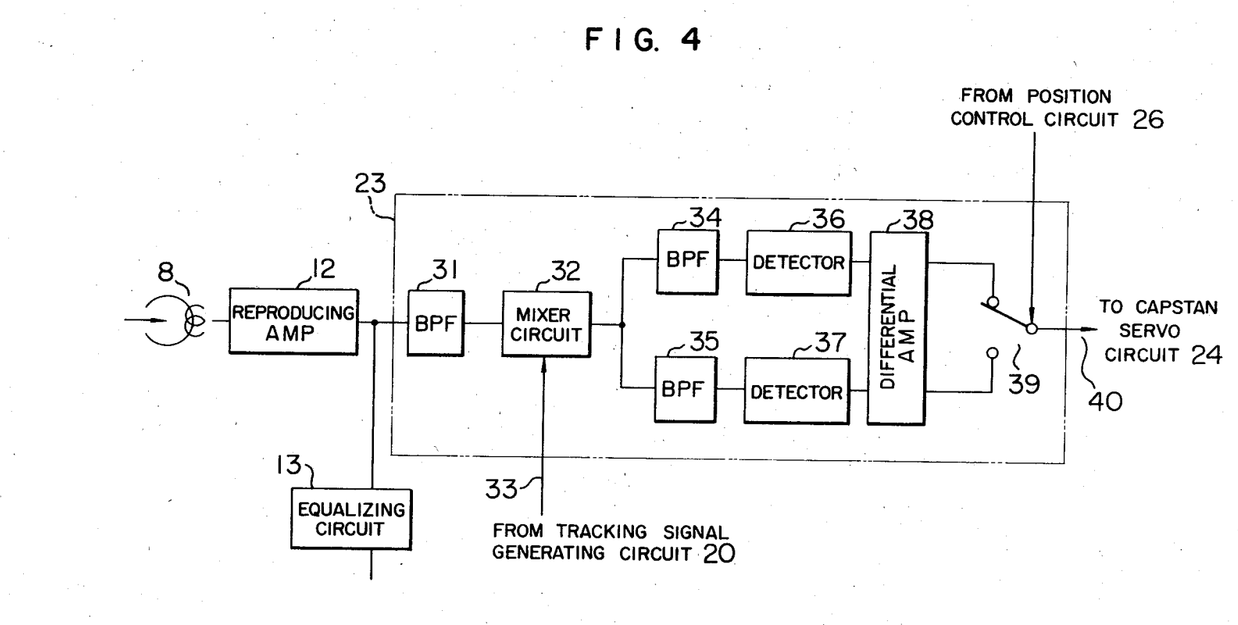
FIG. 4 shows in a block diagram a reproducing section of the apparatus shown in FIG. 1.

Next, the tracking control in the reproducing operation mode will be described by referring to FIG. 4. The signal picked up by the recording/reproducing heads 8-1 and 8-2 is supplied to the input of the tracking control circuit 23 after having been amplified through the reproducing amplifier 12. In the tracking control circuit 23, the reproduced tracking signal superposed or overloapped on the digital information or data signal is extracted by means of a band-pass filter 31. Subsequently, a difference frequency signal between the reproduced tracking signal and the tracking signal for the track to be traced by the recording/reproducing heads 8-1, 8-2 is derived by a mixer circuit 32. The output signal of the mixer circuit 32 is utilized to select a band-pass filter 34 or 35 which serves to select the frequency component $f_H$ or $3 f_H$, wherein the output of the band-pass filter 34 or 35 is detected by a detector 36 or 37, the detection output being applied to an input of a differential amplifier 38 to thereby obtain a tracking error signal 40. A switch 39 serves to change over the direction of tracking deviation.

By the way, in the case of the hitherto known overlap type VTR apparatus shown in FIG. 1, the video signal and the digitized PCM audio signal are simultaneously recorded or reproduced. In this connection, there exists a great demand for the digital signal recording and reproducing apparatus of a miniature size destined only for the audio signal application in view of the improved audio signal quality and manipulatability. In such digital signal recording/reproducing system only for the audio signal, importance is also placed on the digital dubbing of the audio signal available from a CD (compact disk) player system and a PCM broadcasting in addition to the aforementioned application for the recording and reproduction of the audio signal converted into the PCM digital signal. In the case of the CD system, the sampling frequency is 44.1 KHz, while in the PCM broadcasting two different sampling frequencies of 48 KHz and 32 KHz, respectively, are employed. When the sampling frequency is changed over from 44.1 KHz for a first (standard) mode to 32 KHz for a second mode, the transmission rate is correspondingly reduced. As a consequence, the four tracking signals exert adverse influence to low frequency components of the digital signal, resulting in that the error rate is increased and that the S/N ratio of the four tracking signals is degraded, possibly rendering the precision tracking to be impossible.

Figure 5:
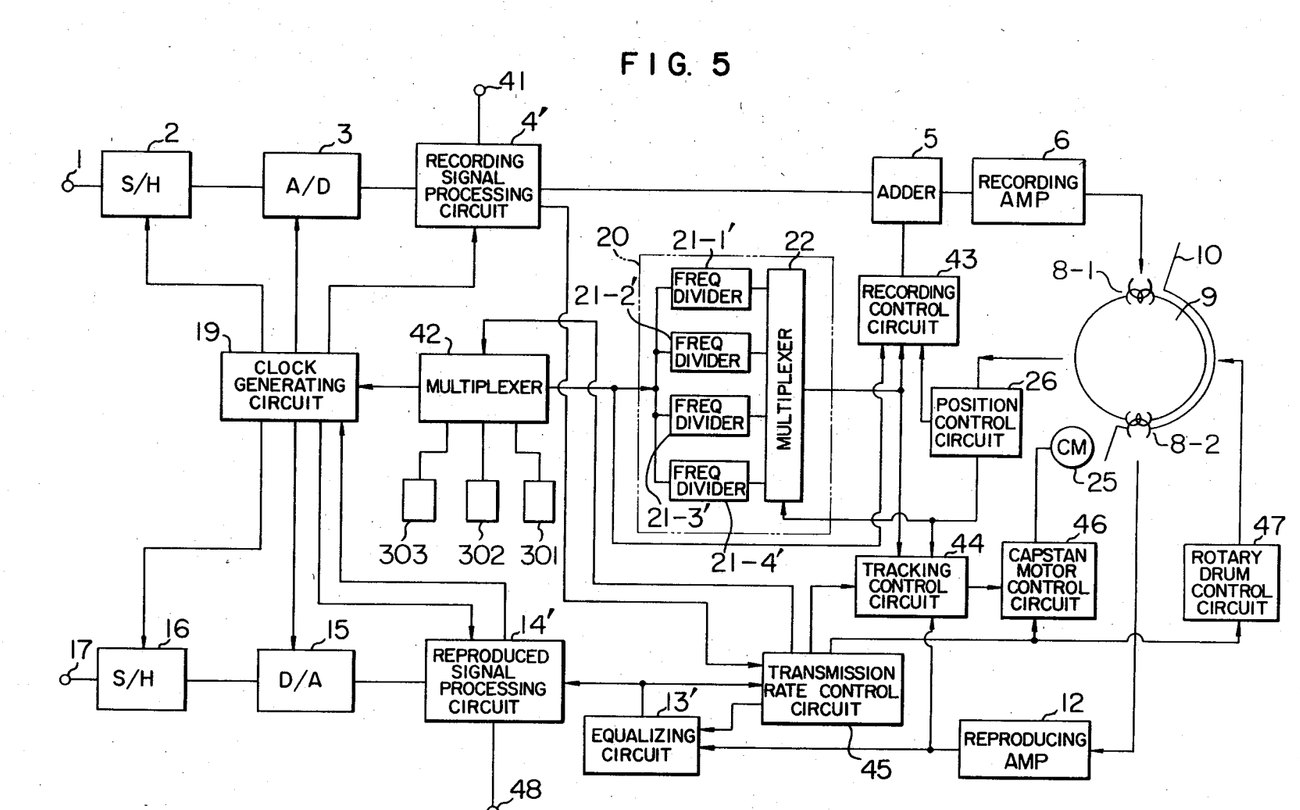
FIG. 5 shows in a block diagram a rotary head type digital signal recording and reproducing apparatus according to an exemplary embodiment of the present invention.

Now, the invention will be described in detail by referring to FIG. 5 which shows in a block diagram a rotary head type PCM recording and reproducing apparatus according to an exemplary embodiment of the present invention. The apparatus shown in FIG. 5 is arranged such that the recording region for the tracking signal does not overlap the recording region for the digital information or data signal and that the revolution number of the rotary drum, the transportation or traveling speed of the recording medium or tape and the frequency of the tracking signal are made variable in dependence on the transmission rate of the information digital signal to be recorded, to thereby make constant the wavelength as recorded. In FIG. 5, the members attached with the same symbols as those shown in FIG. 1 may be of the same structures and connections as the latter. A reference numeral 4' denotes a recording signal processing circuit, 13' denotes a waveform equalizer circuit, 14' denotes a reproduced signal processing circuit, 41 denotes a digital dubbing input terminal, 42 denotes a multiplexer, 43 denotes a recording control circuit, 44 denotes a tracking control circuit, 45 denotes a transmission rate control circuit, 46 denotes a capstan motor control circuit, 47 denotes a rotary drum control circuit, 48 denotes a digital dubbing output terminal, 301 denotes a reference signal generator for generating the sampling frequency of 44.1 KHz, 302 denotes a reference signal generator for the sampling frequency of 48 KHz, and 303 denotes a reference signal generator for the sampling frequency of 32 KHz.

Figure 8:
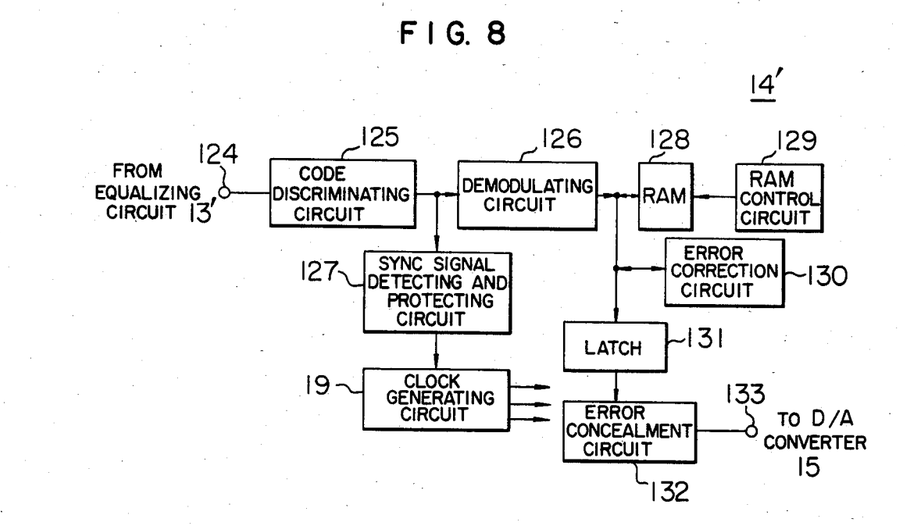
FIG. 8 shows in a block diagram a reproduced signal processing circuit which can be employed in the apparatus shown in FIG. 5.

In the recording operation, the transmission rate is determined by the transmission rate control circuit 45 manually or automatically in dependence on the sampling frequency (a determinative for the transmission rate) of the signal to be recorded as supplied from the analogue signal input terminal 1 or the digital dubbing input terminal 41, as will hereinafter be described in more detail in conjunction with FIGS. 8 and 13. The output of the transmission rate control circuit 45 is supplied to the input of the multiplexer 42 which responds thereto for selecting one of the reference signal generators 301, 302 and 303, to cause the reference clock produced by the selected generator to be supplied to the clock generating circuit 19 and the tracking signal generating circuit 20. Additionally, the output signal of the transmission rate control circuit 45 is also supplied to the capstan motor control circuit 46 and the rotary drum control circuit 47 to correspondingly control the tape transportation speed and the revolution number of the rotary head drum, respectively. It is assumed that the signal to be recorded is quantized in 16 bits for the sampling frequencies of 44.1 KHz and 48 KHz, while it is quantized in 12 bits for the sampling frequency of 32 KHz. On the assumption, upon chaging-over of the sampling frequency from 44.1 KHz to 32 KHz, the multiplexer 42 selects the reference signal generator 303 for the sampling frequency of 32 KHz. Consequently, the clock signal inputted to the tracking signal generating circuit 20 varies by a ratio of $(32 \times 12)/(44.1 \times 16)$ for the given constant redundancy, resulting in that the four frequencies of the tracking signal undergo the change by the same ratio. Further, the tape traveling speed as well as the revolution number of the head drum or cylinder is proportionally changed at the same ratio. In this way, the recording wavelength and the recording format on the tape may remain constant. In the case of the embodiment shown in FIG. 5, three kinds of the reference signal generators 301, 302 and 303 are employed. However, in place of using the three reference signal generators, it is also possible to provide a single reference signal generator which is designed to produce a reference signal of a frequency corresponding to a minimum common multiple of the three reference frequencies mentioned above, wherein the divisor values of the frequency divider circuits 21-1, . . . , 21-4 and the clock generating circuit 19 may be correspondingly changed over, to the same effect.

Next, description will be made in detail on the recording signal processing circuit which is adapted to perform the time base (or axis) compression as well as addition of the error detection and correction codes to the digital input data supplied from the A/D converter 3.

Figure 6:
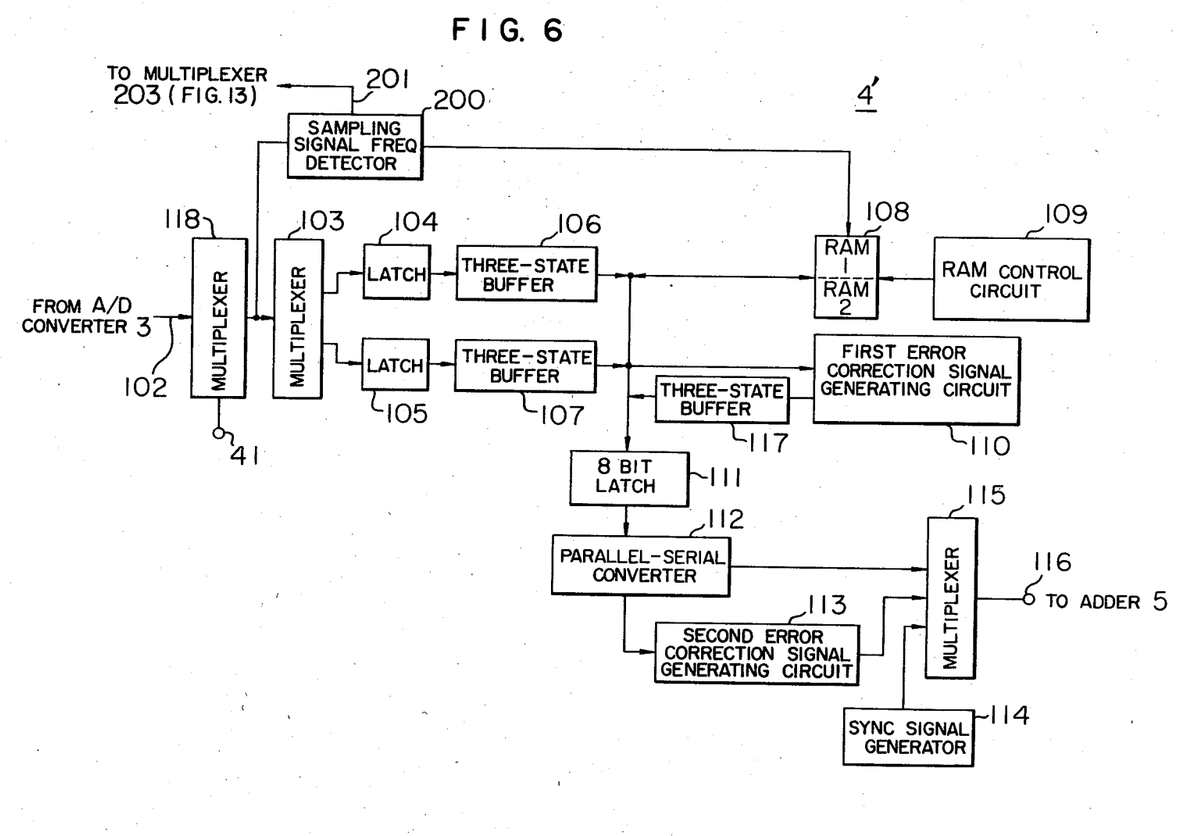
FIG. 6 shows in a block diagram a recording signal processing circuit which can be employed in the apparatus shown in FIG. 5.

FIG. 6 is a block diagram showing in detail a circuit arrangement of the recording signal processing circuit 4'. In the figure, a reference numeral 118 denotes a multiplexer for selecting the output 102 of the A/D converter 3 or the signal supplied through the digital dubbing input terminal 41, a numeral 103 denotes a multiplexer for dividing a 16-bit signal into the more significant eight bits and the less significant eight bits for the outputs, 104 and 105 denote 8-bit latches, respectively, 106, 107 and 117 denote, respectively, three-state buffers for the input/output interface to a memory 108 including RAM (Random Access Memory) 1 and RAM 2, a numeral 109 denotes a RAM control circuit for controlling write and read operations to and from the memory 108, a numeral 110 denotes a first error correction signal generating circuit, 111 denotes a 8-bit latch, 112 denotes a parallel-to-serial (P/S) converter for converting a 8-bit parallel signal to a serial signal, 113 denotes a second error correction signal generator circuit, 114 denotes a synchronizing signal generator for generating a synchronizing signal for the PCM data, and 116 designates the output of the recording signal processing circuit. Referring to FIG. 6, the digital signal 102 outputted from the A/D converter 3 or the signal supplied from the digital dubbing input terminal 41 is selected by the multiplexer 118 and subsequently halved into a pair of data, one consisting of the eight more significant bits with the other consisting of the eight less significant bits, the halved data each of eight bits being latched by the 8-bit latches 104 and 105, respectively. Besides, the halved data each of eight bits are transmitted to the memory 108 through the three-state buffers 106 and 107, respectively. In the memory, each of the halved data is stored at a predetermined address and additionally supplied to the first error correction signal generating circuit 110. The data supplied to the first error correction signal generating circuit 110 is added with an error correction code and returned to the memory 108 to be stored therein. The data read out from the memory 108 is sent to the 8-bit latch 111, whereby the parallel data signal is converted into the serial data signal through the P/S (parallel-to-serial) converter 112. The data now converted into the serial signal form is supplied to the second error correction signal generating circuit 113 and the multiplexer 115. The second error correction signal generating circuit 113 creates a second error correction code on the basis of the serial data signal, which code is sent to the multiplexer 115 at a predetermined timing. The multiplexer 115 changes over the output of the P/S converter 112, the output of the second error correction signal generating circuit 113 and the output signal of the synchronizing signal generator 114 at a predetermined timing, to thereby produce the output 116 of the recording signal processing circuit.

It should here be mentioned that the time base (axis) compression of the digital data is accomplished with the aid of the memory write-in signal and the memory read-out signal, both being produced by the RAM control circuit 109. The structure shown in FIG. 6 is, except the circuit arrangement relative to the blocks 118 and 200, is known and may be of a same configuration of the signal processing circuit 4 shown in FIG. 1.

Figure 7:
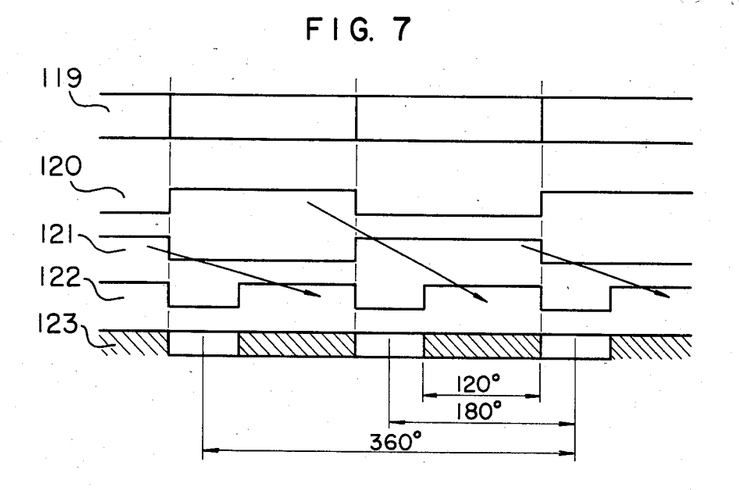
FIG. 7 is a timing chart for illustrating operation of the recording section of the apparatus shown in FIG. 5.

FIG. 7 shows a timing chart for illustrating operation of the recording section of the recording/reproducing apparatus shown in FIG. 5. The audio signal converted into the PCM digital signal through the A/D converter is segmented or divided for each predetermined number of samples, as illustrated at 119 in FIG. 7, wherein each segment or division is recorded as a single frame on the recording medium 10. More specifically, the halved data are stored in RAM 1 and RAM 2 of the memory 108 on the halved data basis at the timings indicated at 120 and 121 in FIG. 7, respectively. The memory for accomplishing the timed processing of this kind may be realized by using alternately the RAM 1 and RAM 2 of the memory 108. The data stored in the RAM 1 and RAM 2 are read out therefrom at a timing shown at 122 in FIG. 7 after the data having undergone the error correction processing described hereinbefore, whereby the time base compression is accomplished, resulting in the signal 123 which can now be recorded. Referring to FIG. 7 at 123, the regions shown by hatching are assigned for recording the audio or data (information) signal. In the case of the embodiment being now described, the wrap angle of the recording medium wrapped around the rotary drum is 180°, wherein a region corresponding to ca. 120° is assigned for the recording of the audio signal. However, it will be appreciated that the invention is never restricted to the wrap angle and the audio signal recording region of the above values. They may be set at other values, as applications require.

Next, the reproduced signal processing circuit 14' will be described. Referring to FIG. 8 which shows in a block diagram the reproduced signal processing circuit 14', a reference numeral 124 denotes the output of the waveform equalizing circuit 13', a numeral 125 denotes a code discriminating circuit, 126 denotes a demodulating or decoding circuit, 127 denotes a synchronizing signal detecting and protecting circuit, 128 denotes a RAM, 129 denotes a RAM control circuit, 130 denotes an error correction circuit, 131 denotes a latch, 132 denotes an error concealment circuit, and a numeral 133 denotes the output of the error concealment circuit 132. With the circuit arrangement shown in FIG. 8, the output of the waveform equalizer 13' is supplied to the code discriminating circuit 125 which performs the code discrimination and reproduction of the clock. The signal undergone the code discrimination is inputted to the demodulating (decoding) circuit 126 on one hand and to the synchronizing signal detecting and protecting circuit 127 on the other hand, whereby the synchronizing signal is produced and supplied to the clock genrating circuit 19 which responds thereto for producing the control clock signal. The clock signal is supplied to the inputs of the various circuit, although not shown in the drawing.

The signals decoded through the demodulating circuit 126 are inputted to the RAM 128 and read out therefrom in a predetermined sequence under control of the RAM control circuit 129 to be subsequently supplied to the error correction circuit 130 in which data suffering error is detected and corrected. The signal which has undergone the error data detection and correction processing is latched by the latch 131 and supplied to the error concealment circuit 132 where the still erroneous data is concealed. The output 133 of the error concealment circuit 132 is supplied to the D/A converter 15.

Figure 9:
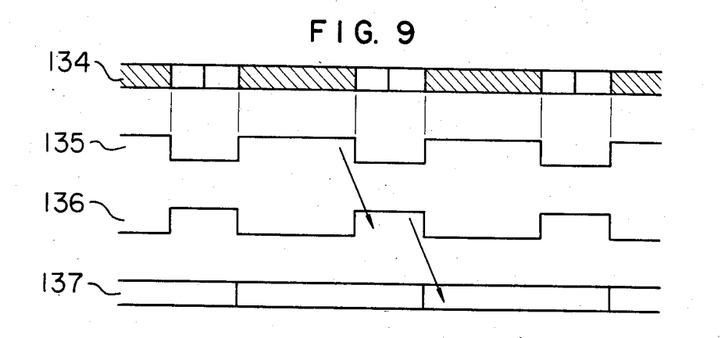
FIG. 9 shows a timing chart for illustrating operation of the reproducing section of the apparatus shown in FIG. 5.

FIG. 9 shows a timing chart for illustrating operation of the reproducing section of the digital signal recording/reproducing apparatus shown in FIG. 5. The output signal from the recording/reproducing heads is obtained at a timing indicated at 134. The audio data recorded in the hatched regions are sequentially stored in the RAM 128 at a timing indicated at 135 in FIG. 9. The data stored in the RAM undergo the decoding processing such as the error detection and correction processing and are subsequently subjected to the time axis expansion processing so as to have a predetermined period.

Next, the tracking control will be described. The four tracking signals of the different frequencies produced by the frequency division circuits 21-1', ..., 21-4', respectively, are sequentially inputted to the recording control circuit 43 through the multiplexer 22 which is changed over by the output signal (similar to a track switch signal) of the position control circuit 26 which in turn is controlled by the output of means for detecting the angular positions of the heads. The four tracking signals are of rectangular waveform signals which have, for example, frequencies $f_1 = 3 \times 6.5\ f_H\ (\approx 308\ \text{KHz})$, $f_2 = 3 \times 7.5\ f_H\ (\approx 357\ \text{KHz})$, $f_3 = 3 \times 10.5\ f_H\ (\approx 496\ \text{KHz})$ and $f_4 = 3 \times 9.5\ f_H\ (\approx 446\ \text{KHz})$, where $f_H$ represents the horizontal synchronizing signal frequency. The recording control circuit 26 serves to control the recording timings at which the four-frequency tracking signals and the digital data signal are recorded, respectively.

Figure 10:
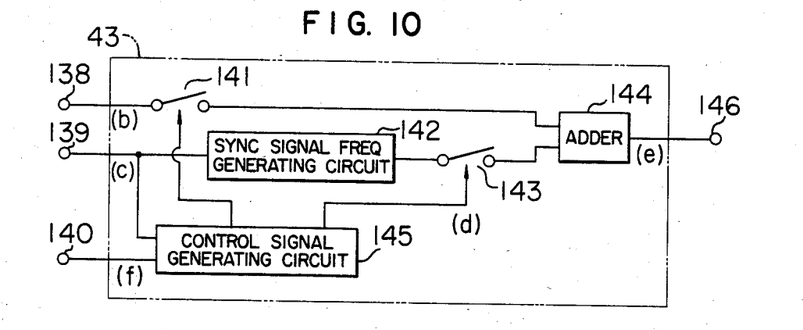
FIG. 10 shows in a block diagram a recording control circuit which can be employed in the apparatus shown in FIG. 5.

FIG. 10 shows in a block diagram an arrangement of the recording control circuit. In the figure, a reference numeral 138 denotes the output of the multiplexer 22 which represents the four tracking signals of different frequencies sequentially changed over by the multiplexer 22 for every track, 139 denotes the clock output of the multiplexer 42, a numeral 140 denotes the output of the position control circuit 26, numerals 141 and 143 denote swiches, respectively, 142 denotes a synchronizing signal frequency generator circuit, 144 denotes an adder circuit, 145 denotes a control signal generating circuit, and 146 denotes the output of the recording control circuit 43. The switches 141 and 143 serve to change over, respectively, the output (b) of the multiplexer 22 having the input supplied with the four-frequency tracking signal and the output of the synchronizing signal frequency generating circuit 142 in response to the output signals (c) and (d) of the control signal generating circuit 145.

Figure 11:
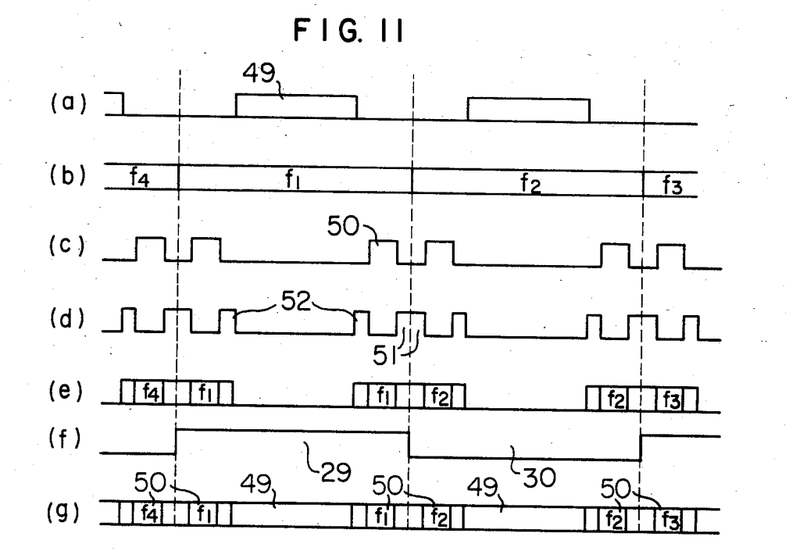
FIG. 11, consisting of (a)–(g) is a view for illustrating a tracking control method according to an exemplary embodiment of the invention.

Operation of the recording control circuit 43 shown in FIG. 10 will be described by referring to the timing chart shown in FIG. 11 in which same reference numerals as those attached to the circuits shown in FIG. 10 denote the output signals of these circuits. In FIG. 11 at (a), there is shown the output signal of the recording signal processing circuit, wherein a numeral 49 designates a period during which the PCM audio signal is recorded. Further, a numeral 50 designates a period in which the four-frequency tracking signal is recorded, 51 denotes blank recording zones which contain no signal and are located at entrance and exit portions of the recording medium at which the recording/reproducing heads come to contact with the recording medium and is released from the contact with the latter, and 52 denotes a blank recording zone interposed between the signal recording period 50 and the digital signal recording period 49. In this connection, it is important to note that in the case of the illustrative embodiment of the present invention, a synchronizing signal of a predetermined frequency is recorded on these blank zones. At (f), there is shown the output of the position control circuit 26, where a numeral 29 denotes a period during which the recording is done by the recording/reproducing head 8-1, and 30 denotes a period during which the recording is done by the recording/reproducing head 8-2.

Referring to FIG. 11, the tracking signals of the different frequencies $f_1$, $f_2$, $f_3$ and $f_4$ which are shown at (b) and which are changed over at each of the signal tracks 29 and 30 can be derived through the switch 141 which is changed over in response to the output (c) of the control signal generating circuit 145, while the blank record zone signals 51 and 52 are obtained by chaning over the output of the synchronizing signal generating circuit 142 by means of the switch 143 which is changed over in response to the signal shown at (d), wherein both the signals mentioned above are added together to consitute the output signal (e) of the recording control circuit 43, the output signal (e) being produced at 146. Accordingly, by adding together the output signal (e) of the recording control circuit 43 and the output signal (a) of the recording signal processing circuit 4' through the adder circuit 5, the signal (g) to be recorded is obtained.

In the case of the example shown in FIG. 11, the tracking signal recording period 50 is provided at two locations. It will however be appreciated that the tracking signal recording period 50 may be provided at one location or more than two locations.

The PCM digital signal recording/reproducing apparatus shown in FIG. 5 is advantageous in that the tracking signal exerts no influence to the digital data signal due to the separation between the period during which the tracking signal is recorded and the digital data signal recording period, whereby the error rate is prevented from increasing, to assure the improved S/N ratio. Further, the frequencies $f_1$, $f_2$, $f_3$ and $f_4$ of the tracking signal can be increased about three times as high as those employed in the hitherto known apparatus on the condition that the error in the reproduction levels between two adjacent tracks due to the azimuth loss is at most 1 dB, whereby the tracking servo function can be significantly enhanced. Besides, because the recording can be performed at the saturated level, the S/N ratio can be remarkably improved. Moreover, by changing the tracking signal frequency in dependence on the transmission rate of the recording data signal, it is possible to maintain the recording wavelength of the tracking and information signals to be constant. Further, by virtue of the separation of the tracking signal recording region and the digital data recording region from each other, it is possible to record only the digital data posteriorly, to another advantage. In other words, the re-writing of data signal as well as the mixing thereof with other information or data signal is possible by virtue of the improved tracking control.

As will be appreciated from the foregoing, it is possible to read out the data at a reduced error rate upon reproduction, because the recording wavelength and the tape format are maintained constant independent of the transmission rate of the recording signal. Accordingly, by arranging the recording signal processing circuir 4' in such a manner in which the a control data recording area is provided within the data recording region 49 to thereby allow the information required for discriminatively identifying the sampling frequency to be recorded in that area, it is possible to discriminate the sampling frequency of the recorded signal upon reproduction thereof (refer to the detector 200 shown in FIG. 6).

Figure 12:
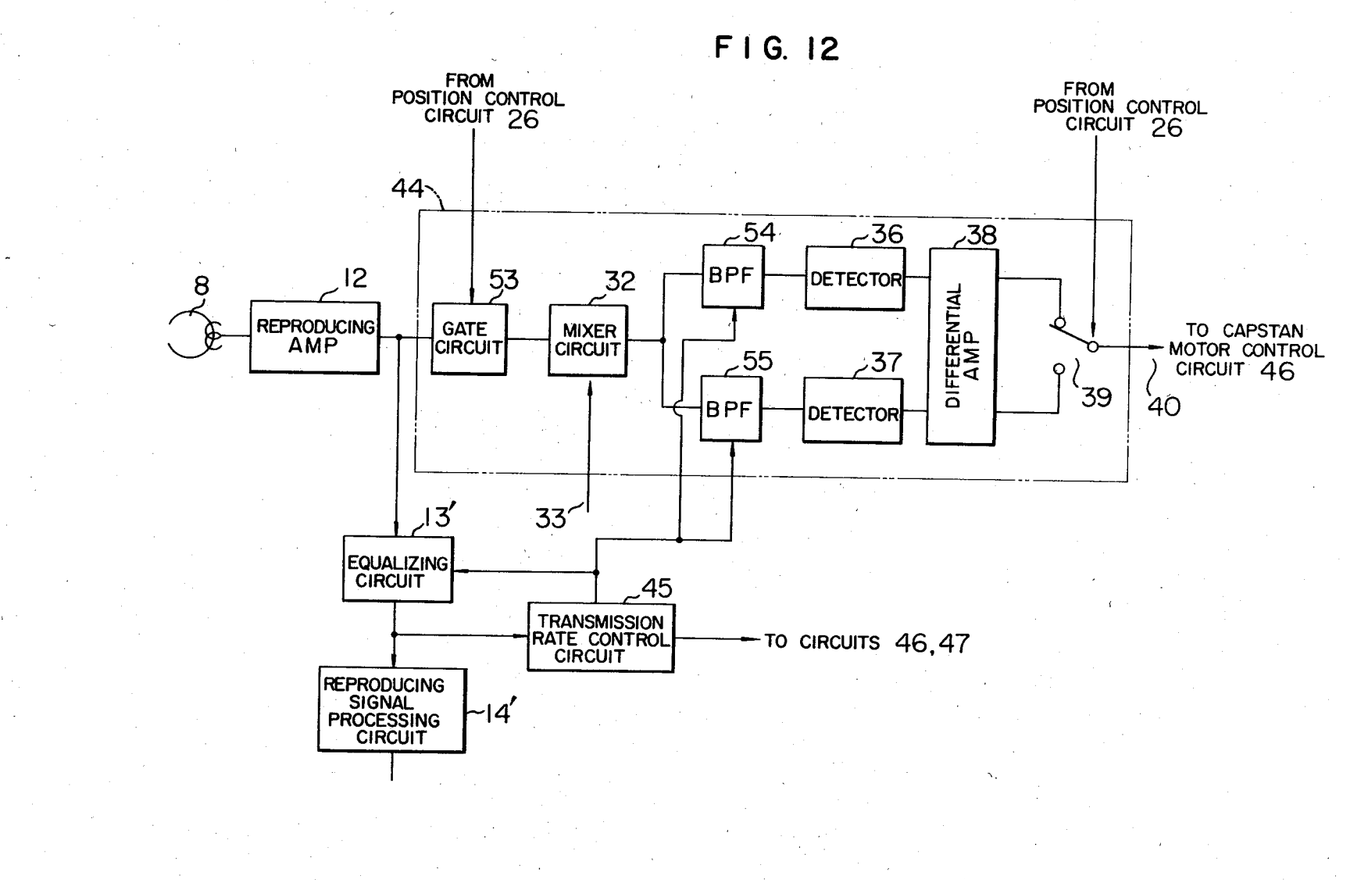
FIG. 12 shows in a block diagram an exemplary arrangement of a tracking control circuit employed in the reproducing section of the apparatus shown in FIG. 5.

FIG. 12 shows in a block diagram the reproducing section of the tracking control system according to an embodiment of the present invention. In FIG. 12, a reference numeral 53 denotes a gate circuit, and 54 and 55 denote, respectively, band-pass filters having respective variable cut-off frequencies for selecting the frequency components $3f_H$ and $(3 \times 3)\ f_H$. The other circuit elements are same as those shown in FIGS. 4 and 5.

The signal picked up by the recording/reproducing heads 8 is amplified through the reproducing amplifier 12 and supplied to the gate circuit 53 driven by a gate control signal produced by the control circuit 26 and having a waveform similar to that shown in FIG. 11 at (c) and additionally to the waveform equalizer circuit 13'. The gate circuit 53 operates to extract the signal recorded during the tracking signal recording period and input that signal to the mixer circuit 32. In the waveform equalizer circuit 13', the equalizer for the signal of the sampling frequency of 44.1 KHz is first employed to equalize the signal, the equalized signal being supplied to the transmission rate control circuit 45 which reads the control data from the input data to output the detected sampling frequency of the recorded signal. For the signal of the sampling frequency of 32 KHz, the waveform equalizer circuit 13' is changed over to the 32-KHz mode, while the cut-off frequencies of the band-pass filters 54 and 55 are correspondingly changed. At the same time, the clock frequency is correspondingly changed over by controlling the multiplexer 42 in accordance with the sampling frequency and hence the transmission rate, to thereby set the same tape traveling speed and the same revolution number of the rotary head drum as those used in the recording operation, under the command of the capstain motor control circuit 46 and the rotary drum control circuit 47.

The band-pass filter 54 or 53 may be constituted by a known tank circuit composed of inductance (L) and capacitance (C) elements. The changing-over of the cut-off frequency may be realized by changing over three different types of the tank circuits as provided or alternatively the inductance and/or capacitance elements of the single tank circuit. Alternatively, the band-pass filter may be constituted by an active filter, to a similar effect. The waveform equalizer 13' may be realized in a transversal filter configuration having exchangeable taps which provide different delay times.

Figure 13:
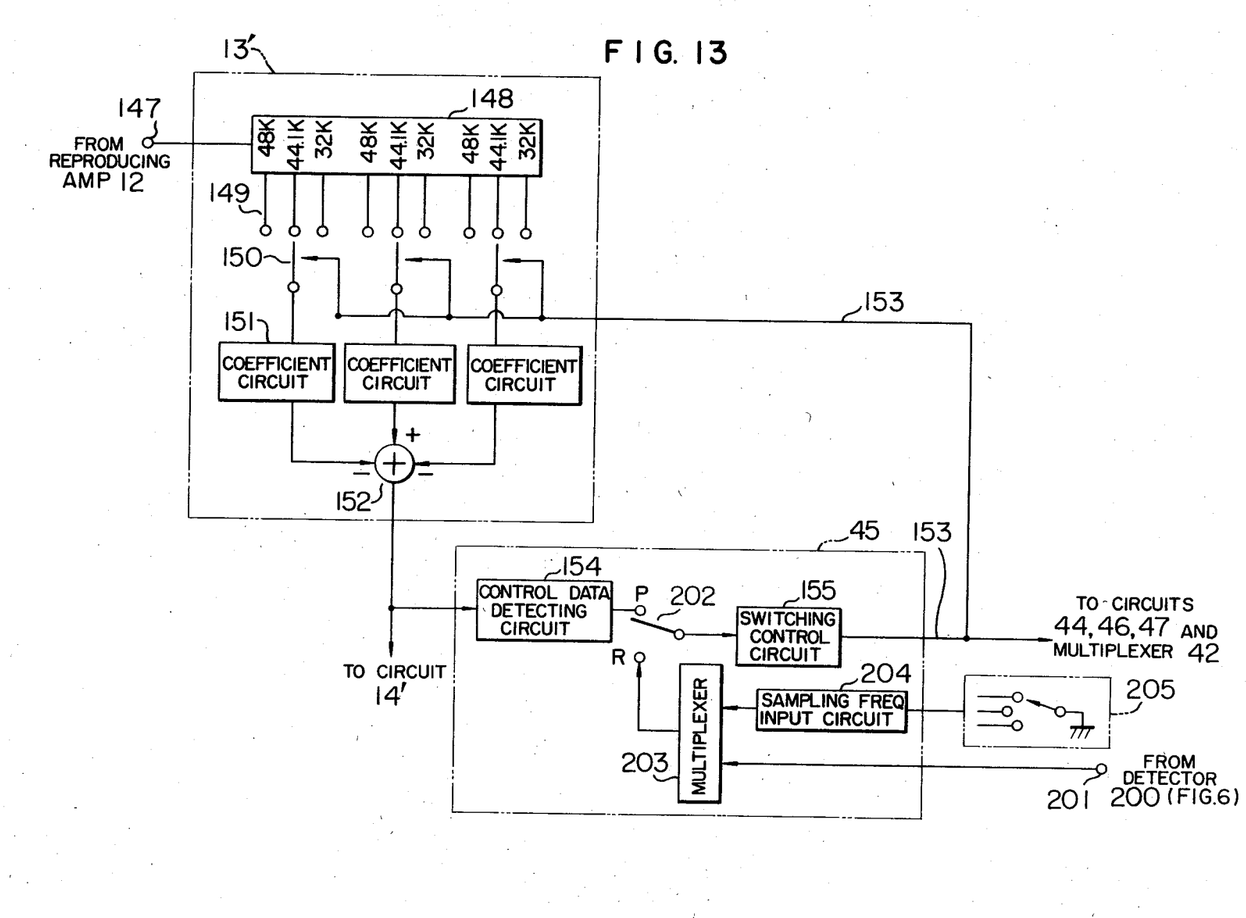
FIG. 13 shows in a block diagram a transmission rate control circuit and a waveform equalizer circuit which can be employed in the apparatus shown in FIG. 5.

FIG. 13 shows exemplary circuit configurations of the transmission rate control circuit 45 and the waveform equalizer circuit 13' constituted by a transversal filter having a total delay time $\tau$.

In FIG. 13, a reference numeral 147 denotes a picked-up digital signal, 148 denotes generally a set of delay elements, 149 generally denotes delay taps, 150 denotes tap changing-over switches, 151 denotes coefficient circuits, 152 denotes an adder, 153 denotes a cut-off frequency switching signal, 154 denotes a control data detection circuit of the transmission rate control circuit, 155 denotes a switching control circuit, 202 denotes a recording/reproduction change-over switch, 203 denotes a multiplexer, 204 denotes a sampling frequency input circuit, and 205 denotes a manual input switch. In the waveform equalizer circuit 13', the optimal delay tap 149 of the delay circuit 148 and the optimal coefficient circuit 151 are selected in dependence on the characteristics of the transmission system including the magnetic head and the recording tape. Since the recording is so performed that the waveform of the recorded signal remains constant irrespective of the different sampling frequencies, as described hereinbefore, it is sufficient to exchangeably select the delay tap 149 by controlling the tap change-over switch with the cut-off frequency switching signal 153 (e.g. 2-bit signal), as is illustrated in FIG. 13. To this end, in the transmission rate control circuit 45, the control data contained in the input data in the form of the sampling frequency is detected by the control data detecting circuit 154. On the basis of the detection signal output of the detection circuit 154, the change-over or switching control circuit 155 produces as the output the cut-off frequency switching signal 153. When the detected signal corresponds to the sampling frequency of 32 KHz, the delay tap corresponding to 32 KHz is selected, whereby optimization is realized.

Next, manual and automatic operation of the transmission rate control circuit 45 shown in FIG. 13 will be described on the assumption that the recording and reproducing apparatus is in the recording mode.

Referring to FIG. 13, in the manual operation, the signal produced by the manual input switch 205 is supplied to the sampling frequency input circuit 204 which sets a value corresponding to the predetermined input sampling frequency. This value is supplied to the switching control circuit 155 through the multiplexer 203 for selecting the manual or automatic operation and the recording/reproduction change-over switch 202 to be utilized for controlling the multiplexer 42, the tracking control circuit 44, the capstan motor control circuit 46 and the rotary drum control circuit 47.

Next, a method of automatically discriminating the transmission rate of the recording signal will be described. Referring to FIG. 6, when the signal supplied from the digital dubbing input terminal 41 includes control data containing the sampling frequency in accompaniment to the recording signal and a plurality of sample data in a time series, the sampling frequency contained in the control data inputted to the sampling frequency detecting circuit 200 is detected, to thereby produce as the output of the circuit 200 the sampling frequency control signal 201 which corresponds to the detected sampling frequency, while the control data is stored in the memory 108. The sampling frequency control signal 201 is supplied to the switching control circuit 155 through the multiplexer 203 and the recording/reproduction change-over switch 202, to thereby control the individual relevant circuits in the manner similar to the manual mode described hereinbefore.

Although the above-described embodiments employ four tracking signals of different frequencies each being related to the horizontal sync signal frequency, the present invention need not be limited thereto, and the tracking controls may have any other frequencies, provided that both the frequency difference $f_a$ between one track and the next preceding track and the frequency difference $f_b$ between the one track and the next suceeding track are always constant.

As will be appreciated from the foregoing description, it is possible according to the teachings of the invention to protect the recording digital data signal and the tracking signal against the mutual interference independent of difference or changes in the transmission rate of the recording signal, whereby the error rate is prevented from being increased, while the S/N ratio of the tracking signal as well as the servo control capability can be improved by increasing the tracking signal frequency and the recording level. Further, the constantly stabilized tracking can be accomplished because the wavelength as recorded can remain constant independent of the transmission rate of the signal to be recorded.

We claim:

1. A rotary head type PCM digital signal recording and reproducing apparatus, comprising:

an analogue-to-digital converter for converting an analogue signal to a PCM digital data signal;

a recording signal processing circuit for performing predetermined processings and time base compression on the output signal of said A/D converter;

a rotary drum having recording/reproducing heads securely mounted thereon for recording and reproducing the output of said recording signal processing circuit on and from a recording medium;

a reproduced signal processing circuit for performing predetermined processings and time base expansion on the PCM digital signal reproduced upon reproduction;

a digital-to-analogue converter for converting the output signal of said reproduced signal processing circuit into an analogue signal;

a tracking signal generating circuit for generating a tracking signal to be utilized for automatically tracking the recording track upon reproduction; and a recording control circuit for controlling the timing at which the output signal of said tracking signal generating circuit is recorded on the recording track, wherein said tracking signal is recorded at least at a location separated from a region in which said PCM digital data signal converted from the analogue signal is recorded.

2. A rotary head type PCM digital signal recording and reproducing apparatus, according to claim 1, further comprising means for changing the revolution number of said rotary head drum, the traveling speed of said recording medium and the frequency of said tracking signal in dependence on the transmission rate of the recording signal, to thereby make constant tape format and recording wavelength on said recording medium.

3. A rotary head type digital signal recording and reproducing apparatus comprising:

a plurality of recording and reproducing magnetic heads mounted on a rotary drum arranged to be driven by rotary drum drive means so that they are capable of recording and reproducing operations on parallel, oblique tracks on a magnetic tape arranged to travel by being driven by tape drive means;

means for detecting the angular positions of said heads and producing a track switch signal;

a recording signal processing circuit for compressing a recording digital information signal on the time base and carrying out such signal processing operations with said recording digital information signal as useful for correct signal reproduction from said magnetic tape;

a source of a reference signal the frequency of which is controllable;

means connected with said reference signal source for producing from said reference signal, a plurality of tracking signals having fixed frequencies different from one another and delivering them sequentially cyclically, under control of said track switch signal so that each of them is recorded by one of said heads on at least one portion of different one track on which portion the digital information signal is not recorded;

means for detecting the transmission rate for said recording digital information signal and producing a transmission rate detection signal and a speed control signal, said transmission rate detection signal being fed to said reference signal source to change the frequency of said reference signal depending upon said transmission rate detection signal while said speed control signal is fed to said tape drive means and said rotary drum drive means to adjust the travel speed of said tape and the rotation speed of said rotary drum depending upon said speed control signal so that the wavelength of a recorded signal of a frequency on said magnetic tape is made constant irrespective of said signal transmission rate;

means for extracting tracking signals of the same nature as those of said tracking signal from reproduced signals provided from said heads in a reproducing operation mode and producing a tracking error signal therefrom under control of said track switch signal, said tracking error signal being fed to said tape drive means to change the travel speed of said tape thereby to adjust the positions of said heads on said tracks; and a reproduced signal processing circuit for expanding digital information signal in said reproduced signal on the time base and carrying out such signal processing operations with the reproduced digital information signal as making use of the signal processing operations in said recording signal processing circuit.

4. An apparatus according to claim 3, in which said means for extracting tracking signals and producing a tracking error signal includes:

a gate circuit arranged to receive said reproduced signal from said heads to pass only said tracking signals;

a mixer circuit for mixing the tracking signal for a track being traced by one of the heads and the output of said gate circuit;

first and second band-pass filters arranged to be fed with said tracking signals from said gate circuit, said first band-pass filter serving to pass a first difference signal component associated with the tracking signals on the track being traced by one of the heads and on one adjacent track thereto while said second band-pass filter serves to pass a second difference signal component associated with the tracking signals on said track being traced and on the other adjacent track thereto; and means for comparing said first and second difference signal components from said first and second band-pass filters to produce said tracking error signal.

5. A tracking control method in a rotary head type digital signal recording and reproducing apparatus having a plurality of rotary magnetic heads capable of recording and reproducing operations on parallel, oblique tracks on a magnetic tape adapted to be driven to travel, the method comprising the steps of:

detecting the transmission rate for a digital information signal to be recorded on said tape;

adjusting the relative speed between said heads and said tape travelling on the basis of the detected transmission rate so that the wavelength of a recorded signal frequency is constant irrespective of said transmission rate;

recording said digital information signal and a tracking signal on a first portion and on at least one second portion of each of said parallel, oblique tracks by said heads, respectively, said first and second portions being physically not overlapped with each other on said each track;

reproducing the information and tracking signals from each track and the tracking signals from the adjacent tracks on both sides of said each track by one of the heads, wherein the reproduced tracking signal for each track and the reproduced tracking signal for a track adjacent one side thereof are mixed to produce a first difference signal and the reproduced tracking signal for each track and the reproduced tracking signal for a track adjacent the other side thereof are mixed to produce a second difference signal;

comparing said first and second diiference signals to detect a tracking error signal; and changing the speed of said traveling magnetic tape on the basis of said detected tracking error signal to adjust the position of said heads on said track so as to make the amplitude of said tracking error signal substantially zero.

6. A method according to claim 5, in which said at least one second portion is located at the trace start end portion of each track.

7. A method according to claim 5, in which said at least one second portion is located at the trace start end portion and at the trace finish end portion of each track.

* * * * *